Aug. 19, 1969  A. B. HAWES  3,462,735
ELECTRONIC TIRE DEFLATION DETECTING DEVICE
Filed May 6, 1966  2 Sheets-Sheet 1
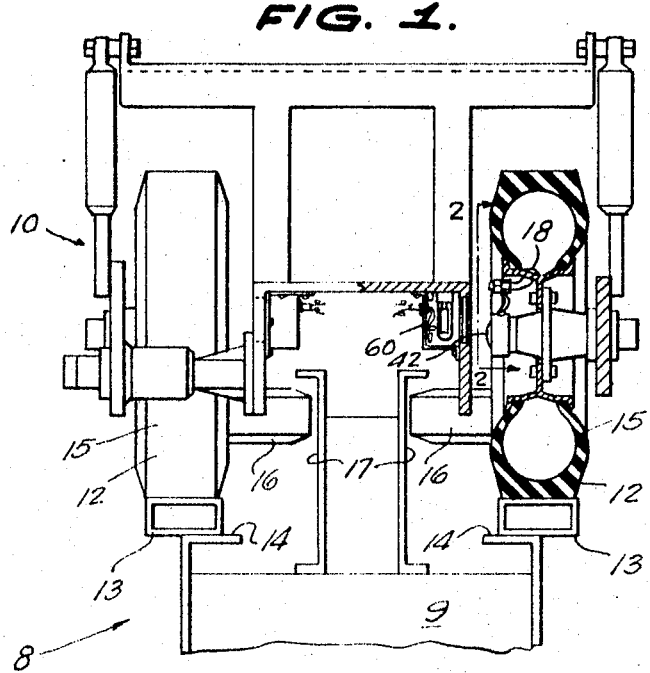
INVENTOR.
ALAN B. HAWES,
BY
Berman, Davidson-Berman
ATTORNEYS.

INVENTOR.
ALAN B. HAWES,
BY
Berman, Davidson & Berman
ATTORNEYS.

United States Patent Office 3,462,735
Patented Aug. 19, 1969

3,462,735
ELECTRONIC TIRE DEFLATION
DETECTING DEVICE
Alan B. Hawes, 8504 Seaview Ave.,
Wildwood Crest, N.J. 08260
Filed May 6, 1966, Ser. No. 548,078
Int. Cl. B60c 23/06
U.S. Cl. 340—58                    4 Claims

ABSTRACT OF THE DISCLOSURE

An electronic device, for indicating deflation of a pneumatic tire below a prescribed pressure, wherein the inflating valve stem of the tire is opened by an element carrying a diaphragm and a switch actuating member housed in a cap closing the inflation tube. Closure of said switch on loss of pressure lights a battery operated lamp which illuminates a photoelectric cell through a lens, the cell being operative in an electronic circuit to energize a signal. In one embodiment said diaphragm, switch, battery, lamp and lens are housed in said cap.

---

This invention relates to an electronic device which indicates whenever the set inflated pressure of a tire is deflated below such pressure.

An object of the present invention is to provide an electronic tire deflation detecting device which is mountable upon a vehicle wheel having a pneumatic tire thereon, which is connectible to the valve controlling the inflation of the tire, and which is operable responsive to deflative pressure applied thereto.

Another object of the present invention is to provide an electronic tire deflation device which is operable responsive to deflative pressure from the inflated pneumatic tire applied thereto to illuminate a lamp and thereby energize a photoelectric cell and illuminate a warning light operatively connected thereto.

A further object of the present invention is to provide an electronic tire deflation device which is simple in construction, positive in action, and commercially practical.

Other objects and advantages of the present invention will become apparent from the following description taken in conjunction with the accompanying drawings, in which:

FIGURE 1 is an end view, with parts broken away and in section, of a truck of a monorail coach mounted upon a monorail having an electronic tire deflation device according to the present invention associated therewith.

FIGURE 2 is a fragmentary view taken on the line 2—2 of FIGURE 1.

FIGUURE 3 is a sectional view taken on the line 3—3 of FIGURE 2.

FIGURE 4 is a sectional view taken on the line 4—4 of FIGURE 2.

FIGURE 5 is a wiring diagram of one of the signal systems in association with one of the photoelectric cells.

Figure 6:
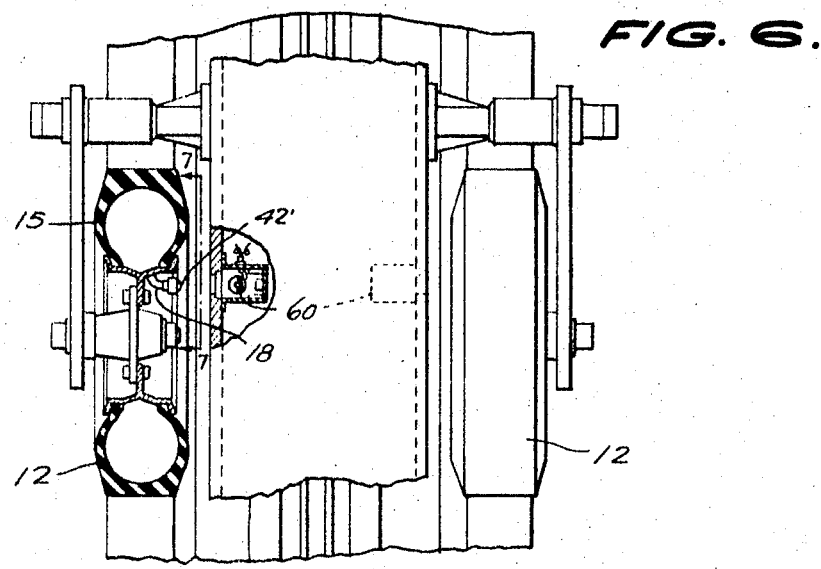

FIGURE 6 is an end view of the assembly of FIGURE 1, with parts broken away and in section, having a modified form of the electronic tire deflation device according to the present invention associated therewith.

Figure 7:
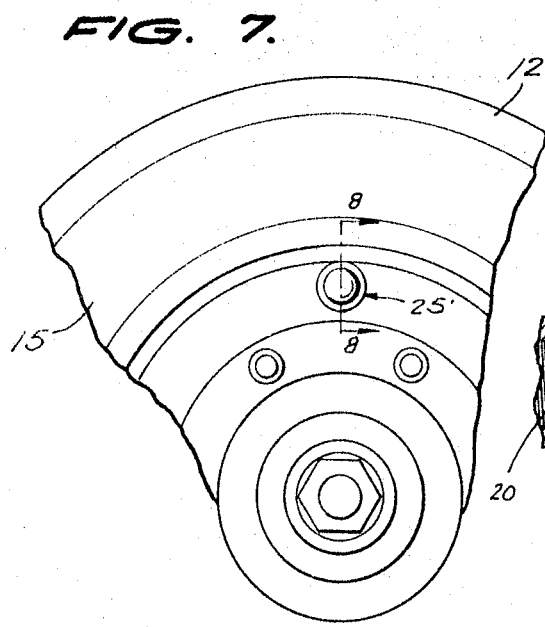

FIGURE 7 is a fragmentary view taken on the line 7—7 of FIGURE 6.

Figure 8:
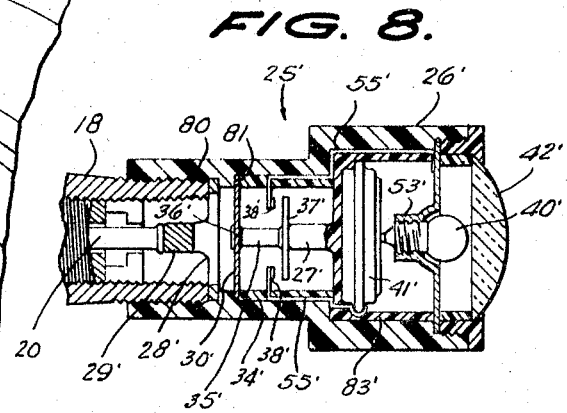

FIGURE 8 is a sectional view taken on the line 8—8 of FIGURE 7.

Referring to FIGURES 1 to 4 of the drawings, the numeral 10 designates a truck of a monorail coach 11, the truck having a pair of supporting or drive wheels 12 which are in rolling engagement with hollow tracks 13 provided on the horizontal surface 14 of a monorail 8. The wheels 12 are each equipped with a pneumatic tire 15. The truck 10 also includes a pair of horizontal guide wheels 16 which are, at times, in rolling engagement with the opposed vertical surfaces 17 rising from the base 9 of the monorail 8.

In FIGURE 1, only one of the wheels 12 is specifically shown in association or combination with the electronic tire deflation detecting device according to the present invention. Of course, each one of the drive or supporting wheels of the trucks on the monorail coach is associated with an electronic tire deflation detecting device according to the present invention. Thus, the electronic tire deflation detecting device of this invention will be described only in association with the supporting or drive wheel 12 shown in section in FIGURE 1.

A hollow externally-threaded tube 18 projects from the pneumatic tire 15 of the wheel 12, shown in section in FIGURE 1, and a valve 19 is in the tube 18 which controls inflation of the pneumatic tire 15. A valve stem 20 is operatively-connected to the valve 19 and projects through and to and inwardly of the free end of the tube 18. The valve 19 is normally in closed position and is actuable to open position upon application of a depressive force to the valve stem 20. This structure is conventional with a pneumatic tire and, hence, no more detailed description of same appears necessary.

Operatively-associated with the wheel 12, FIGURE 1, is an electronic tire deflation detecting device according to the present invention and generally indicated by the numeral 25, the device comprising a cap member embodying a cap 26 which is supported on the wheel 12 and has the internally-threaded portion adjacent one end adjustably-engaged on the externally-threaded tube 18. An element or spider 28, FIGURE 3, is disposed within the cap 26 and seats over the free end of the tube 18, the element or spider 28 having a protuberance 29 depressingly-engaging the valve stem 20 to thereby shift the valve 18 to open position. A transversely-disposed diaphragm 30 is within the cap 26, is located inwardly of and spaced from the element or spider 28, and is supported in the cap 26. Specifically, the diaphragm 30 is supported between washers 31 and 32, the washer 31 being engaged by the element or spider 28 and the washer 32 being engaged by a shoulder 33 formed in the cap 26, as shown in FIGURE 3.

Housed within the cap 26 is a cup-shaped insulator 34 which has its open end fixedly-attached to the diaphragm 30. An elongated actuating member 35 is within and extends longitudinally of the insulator 34, and has one end connected, as at 36, to the diaphragm 30 for movement with the latter. A transversely-disposed switch arm 37 is carried by the actuating member adjacent its other end thereof, and opposed contacts 38 are disposed between the switch arm 37 and the diaphragm 30 and fixedly-project from the wall of the insulator 34. As shown in FIGURE 3, an externally-threaded bolt 27 is in threaded engagement with an internally-threaded aperture 7 formed in the top 26" of the cap 26, the bolt 27 projecting out of the aperture 7 and having on the projecting end a head 27' and having the other end in bearing contact with the other end of the actuating member 35. By manipulation of the head 27 the switch arm 37 may be shifted toward and away from the opposed contacts 38.

A lamp 40 is electrically-connected to the opposed contacts 38, and a battery 41 is electrically-connected to the lamp, the lamp 40 being covered by a lens 42. As shown in FIGURES 1 and 3, a housing 50 is fixedly-attached to the threaded end 51 provided on the hub 52 of the wheel 12, the threaded end being conventional and on the wheel and to which a hub cap is conventionally-threaded.

Mounted within the housing 50 is a battery 41, and screwed into a lamp socket 53 provided in the housing is a lamp 40, the lamp 40 being covered by the lens 42 which is supported in the front end of the housing 50, as shown in FIGURE 4. Of course, the battery 41 and the socket 53 are electrically-connected to the opposed contacts 38 by cables 55.

A photoelectric cell 60 is arranged in co-acting relation with respect to the lens 42, FIGURE 1, the cell 60 being electrically-connected to a signal system including a warning light. As shown in FIGURE 1, the photoelectric cell is carried by the truck and is inwardly of and faces the lens 42. It is to be noted that the diaphragm 30 is operable responsive to deflative pressure applied thereto to illuminate the lamp 40 and thereby energize the photoelectric cell 60 and illuminate the warning light.

By reference to FIGURE 5 it will be seen that a signal system generally indicated by the numeral 73 is electrically-connected to the photoelectric cell 60. This system 73 is of the conventional type and includes a pair of signal lights, one being green in color and indicated by the letter G, and the other being red in color and indicated by the letter R. As shown, the light G is illuminated by virtue of the switch arm 76 being in contacting engagement with the contact 78, and the light R is extinguished due to the switch arm 76 being out of contacting engagement with the contact 77. The numeral 70 designates a power source which is connected by conductors 71 and 72 to a vacuum tube 74. A conductor 75 connects the tube 74 to the photoelectric cell 60, and a conductor 76' connects the photoelectric cell 60 to the conductor 71. A conductor 77' connects the conductor 75 to the conductor 72 and to a condenser 78'. Conductors 79 and 80 connects the tube 74 to a relay 81. The conductor 77' is connected to the conductor 80 and the conductor 79 is connected to the condenser 78' by conductor 82. A conductor 83 connects the conductor 71 to the switch arm 76 and a conductor 84 connects the conductor 72 through the signal light G to the contact 78. A conductor 85 connects the conductor 84 through signal light R to the contact 77.

In operation of the assembly of FIGURES 1 to 4, with the electronic tire deflation detecting device 25, as above-described, should be deflative pressure from the pneumatic tire 15 be such as to cause the said pressure bearing against the diaphragm 30 to decrease, the diaphragm 30 moves toward the spider 28, resulting in the switch arm 37 shifting into bearing engagement with the opposed contacts 38, thereby illuminating the lamp 40. The illumination emitted from the lamp 40 is imposed upon the photoelectric cell 60, exciting the relay 81, and thereby, in turn, causing the switch arm 76 to move out of contacting engagement with the contact 78, and extinguishing the light G, and to move into contacting engagement with the contact 77 and illuminate the light R. Extinguishing of the lamp 40, after the deflative pressure exerted upon the diaphragm 30 has been rectified, de-energizes the photoelectric cell 60, resulting in return of the switch arm 76 to move back into contacting engagement with the contact 78 and extinguishment of the light R and illumination of the light G.

As for the form of FIGURES 6 to 8, such form of the electronic tire deflation detecting device is the same as the device as above-described in connection with FIGURES 1 to 4, except that the housing 50 containing the battery 41, socket 53, lamp 40 and lens 42 of the form of FIGURES 1 to 4 are omitted, and the battery, socket, lamp, and lens are included in the cap member 26, the cap member in the form of FIGURES 6 to 8 being modified so as to comprise a sleeve which houses the spider, cup-shaped insulator, the diaphragm, actuating member, battery, lamp socket, lamp and lens.

As shown in FIGURES 6 to 8, the electronic tire deflation detecting device 25' comprises a cap member embodying an insulated sleeve 26' which is supported on the wheel 12, and has the internally-threaded portion adjacent one end adjustably-engaged on the externally-threaded tube 18. The element or spider 28', FIGURE 8, is disposed within the sleeve 26' and seats over the free end of the tube 18 and is held in such seating engagement by virtue of its engagement with a first shoulder 80 formed in the sleeve 26'. The element or spider 28' has a protuberance 29' which depressingly-engages the valve stem 20 to thereby shift the valve 19 to open position, a transversely-disposed diaphragm 30' is within the sleeve 26' and seats against a second shoulder 81 formed in the sleeve 26', the shoulder 81 being inwardly of and spaced from the first shoulder 80. Housed within the sleeve 26' is a cup-shaped insulator 34' which has its open end bearing against the diaphragm 30'. An elongated actuating member 35' is within and extends longitudinally of the insulator 34', and has one connected, as at 36', to the diaphragm 30 for movement with the latter. A transversely-disposed switch arm 37' is carried by the actuating member 35' adjacent its other end thereof, and opposed contacts 38' are disposed between the switch arm 37' and the diaphragm 30' and fixedly-project from the wall of the insulator 34'. A pin 27' projects perpendicularly from the bottom of the insulator 34' and has its free end bearing against the other end of the actuating member 35'. Also, housed within the sleeve 26' is an insulated tube 83' which has one end integrally-attached to the bottom of the insulator 34'. Disposed within the tube 83' is a battery 41' which is in electrical contact with a lamp 40' mounted in a lamp socket 53' supported in the sleeve 26' inwardly of and adjacent the other end. A lens 42' covers the lamp 40' and closes the other end of the sleeve 26'. Of course, the battery 41' and the socket 53' are electrically-connected to the opposed contacts 38' by conductors 55'.

Operation of the thus-described device 25' is the same as above-described in connection with the device 25.

What is claimed is:

1. The combination with a vehicle wheel having a pneumatic tire mounted thereon, a hollow externally-threaded tube projecting from said tire, a valve in said tube and controlling inflation of said tire, and a valve stem operatively-connected to said valve and projecting through and adjacent to and inwardly of the free end of said tube, said valve being normally in closed position and being actuable to open position upon application of a depressive force to said valve stem, of an electronic tire deflation detecting device comprising a cap member supported on said wheel and adjustably-engaged on said threaded tube, an element within said cap member and seating over the free end of said tube and having a protuberance depressingly-engaging said valve stem to thereby shift the valve to open position, a transversely-disposed diaphragm within said cap member inwardly of and spaced from said element and supported in said cap member, a cup-shaped insulator having an open end housed in said cap member and having its open end bearing against said diaphragm, an elongated actuating member within and extending longitudinally of said insulator and having one end connected to said diaphragm for movement with the latter, a transversely-disposed switch arm carried by said member adjacent its other end, opposed contacts between said switch arm and said diaphragm and fixedly-projecting from the wall of said insulator, a battery electrically-connected to said contacts, a lamp electrically-connected to said battery, a lens covering said lamp, and a photoelectric cell arranged in co-acting relation with respect to said lens and adapted to be electrically-connected to a signal system including a warning light, said diaphragm being operable responsive to deflative pressure applied thereto to illuminate said lamp and thereby energize said cell and illuminate the warning light of the signal system when electrically-connected to said cell.

2. The combination according to claim 1, which includes in addition a threaded bolt in threaded-engagement with the top of said cap member and having one end exterior of the top of said cap member and having the other end in bearing contact with the other end of said actuating member, said bolt being operable to shift said switch arm toward and away from said opposed contacts.

3. The combination according to claim 1, wherein said battery, lamp, and lens, are housed in a housing fixedly-carried by said wheel.

4. The combination according to claim 1, wherein said battery, lamp, and lens are housed in said cap member.

References Cited

UNITED STATES PATENTS 3,260,233   7/1966   Bergunder _____ 116—34

ALVIN H. WARING, Primary Examiner

U.S. Cl. X.R.

116—34; 200—61.22